W. L. F. MALABY.
ANIMAL POKE.
APPLICATION FILED AUG. 11, 1909.
1,060,470.
Patented Apr. 29, 1913.
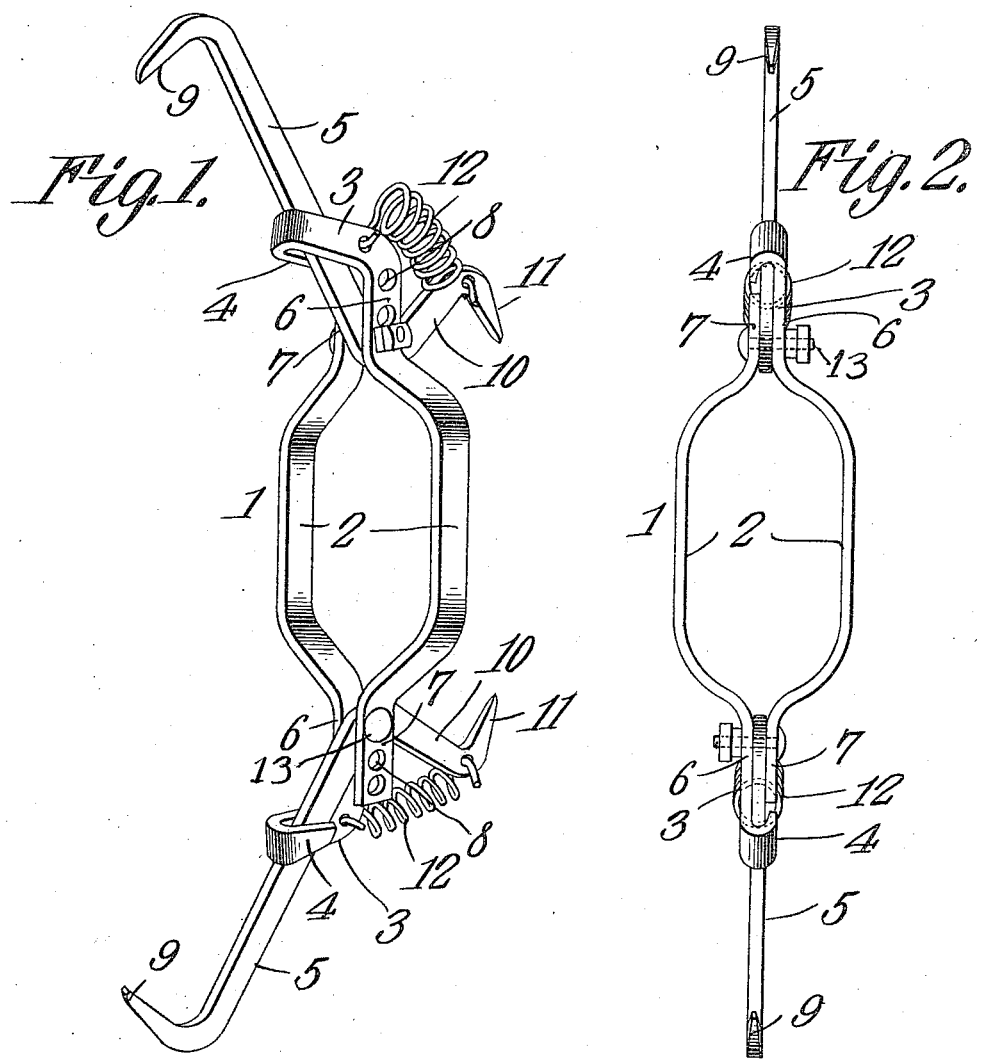
WITNESSES:
William L. F. Malaby,
INVENTOR.
By C. A. Snow & Co.
ATTORNEYS

UNITED STATES PATENT OFFICE.

WILLIAM L. F. MALABY, OF GOLTRY, OKLAHOMA.

ANIMAL-POKE.

1,060,470.

Specification of Letters Patent.   Patented Apr. 29, 1913.

Application filed August 11, 1909.   Serial No. 512,435.

*To all whom it may concern:*

Be it known that I, WILLIAM L. F. MALABY, a citizen of the United States, residing at Goltry, in the county of Alfalfa and State of Oklahoma, have invented a new and useful Animal-Poke, of which the following is a specification.

This invention has relation to animal pokes and it consists in the novel construction and arrangement of its parts as hereinafter shown and described.

The object of the invention is to provide a poke which is adapted to be applied to the neck of the animal and which is provided with hook members pivotally attached to the yoke portion of the poke and which when brought in engagement with the rails of a fence or a gate are adapted to be swung so as to bring pronged ends into engagement with the neck of the animal. Such engagement of the pronged ends will subject the animal to discomfort and pain which will cause it to desist in its attempt to project its head through the fence or gate or to get over or under the same. Springs are provided for normally holding the pronged ends of the hook members away from and out of engagement with the neck of the animal.

In the accompanying drawing:—Figure 1 is a perspective view of the poke, and Fig. 2 is a rear elevation of the same.

The poke comprises the yoke 1 which is made up of the two side members 2, 2 of similar configuration. Each side member 2 is provided at one end with a forwardly disposed hook 3 which terminates in a return bend 4. The hook 3 of one of the side members 2 is located at the upper end of the yoke while the hook 3 of the other member is located at the lower end of the yoke. L-shaped members 5 are pivoted at their angles between the parallel end portions 6 of the members 2 and the ends 7 thereof which are devoid of the hooks. The end portions 6 and ends 7 are provided with a series of perforations 8 by means of which a bolt 13 may be passed through a pair of said perforations to adjustably pivot the members 5 according to the size of the animal. The intermediate portions of the forward arms of the members 5 normally rest in the return bends 4 of the hooks 3. The outer ends of the said arms are provided with the hooks 9 while the inner arms 10 of the said members 5 are angularly disposed and terminate in the prongs 11. Contractile coil springs 12 are attached or hooked at one end through the hooks 3 of the side members 2 and at their opposite ends are connected with the rear arms 10 of the said members 5. The ends of the contractile springs 12 being hooked through the forwardly projected ends of the members 2 provide stops in order to limit the rearward swinging motion of the arms 5, so that the L-shaped members may not swing rearward excessively, which would tend to injuriously force the prongs 11 into the body of the animal. The tension of the said springs is such as to have a tendency to maintain the members 5 against the return bends 4 of the hooks 3 and consequently, the prongs 11 are normally held away from the neck of the animal. When, however, the neck of the animal brings either one of the hooks 9 in engagement with the rail of a fence or gate the member 5 thus brought in contact with the rail is swung upon its pivot against the tension of the spring 12 and the prong 11 carried by said member 5 is forced into contact with the neck of the animal. The pain incident to such contact will cause the animal to move its head away from the rail when the tension of the spring 12 will pull the prong 11 away from the neck of the animal and seat the member 5 against the return bend 4 of the hook.

It will be observed that an animal poke of simple construction is provided; one in which the parts comprising the yoke are of the same configuration and the pivoted members are also of the same configuration, consequently, the parts may be cheaply manufactured and readily assembled and that the members 5 may be so adjusted upon the yoke as to bring the ends of the prongs 11 closer together or farther apart as desired.

Having described my invention what I claim as new and desire to secure by Letters Patent is:—

An animal poke comprising duplicate and supplementary side members having juxtaposed parallel ends at the top and bottom, one of each pair of ends being projected forward into a hook having a return bend, two L-shaped members pivoted at their angles between the said ends with their longer arms projecting forward and resting normally in said bends and having their extremities hooked, and their shorter arms projecting rearward and the extremities thereof provided with a sharpened prong, and a contractile spring connected at one end to the short arm of each of said members and having its other end hooked through the corresponding forwardly projected end so as to form a stop for the long arm of the corresponding member to limit its rearward swinging motion.

In testimony that I claim the foregoing as my own, I have hereto affixed my signature in the presence of two witnesses.

WILLIAM L. F. MALABY.

Witnesses:
 CHAS. M. DELZELL,
 E. R. MOSELEY.

Copies of this patent may be obtained for five cents each, by addressing the "Commissioner of Patents, Washington, D. C."